United States Patent
Zhou et al.

(10) Patent No.: US 12,307,377 B2
(45) Date of Patent: May 20, 2025

(54) GENERATING DATA BASED ON PRE-TRAINED MODELS USING GENERATIVE ADVERSARIAL MODELS

(71) Applicant: International Business Machines Corporation, Armonk, NY (US)

(72) Inventors: Wang Zhou, White Plains, NY (US); Yang Zhang, Cambridge, MA (US); Shiyu Chang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 17/110,629

(22) Filed: Dec. 3, 2020

(65) Prior Publication Data

US 2022/0180203 A1 Jun. 9, 2022

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ........ G06N 3/088; G06N 3/045; G06N 3/047; G06N 3/084; G06N 3/094; G06N 3/0475
See application file for complete search history.

(56) References Cited

U.S. PATENT DOCUMENTS

| | | | |
|---|---|---|---|
| 9,015,093 B1 | 4/2015 | Commons | |
| 9,666,184 B2 | 5/2017 | Lee et al. | |
| 11,087,170 B2* | 8/2021 | Malaya | G06K 9/6255 |
| 11,455,495 B2* | 9/2022 | Nikolenko et al. | G06K 9/6257 |
| 2019/0279009 A1 | 9/2019 | Srirangam Narashiman et al. | |
| 2021/0383274 A1 | 12/2021 | Takahashi et al. | |

FOREIGN PATENT DOCUMENTS

| | | | | |
|---|---|---|---|---|
| CN | 110334806 A | * | 10/2019 | ........... G06F 18/241 |
| CN | 111476783 A | | 7/2020 | |
| WO | 2020/084683 A1 | | 9/2021 | |
| WO | 2021208601 A1 | | 10/2021 | |
| WO | WO 2019127231 A1 | * | 1/2024 | ............. G06N 3/094 |

OTHER PUBLICATIONS

Zilong Lin et al., IDSGAN: Generative Adversarial Networks for Attack Generation against Intrusion Detection, Jun. 2019, Shool of Cyber Security, Shangai Jiao Tong University.*

(Continued)

*Primary Examiner* — Van C Mang

(74) *Attorney, Agent, or Firm* — Patterson + Sheridan, LLP

(57) ABSTRACT

Techniques for generator model training are provided. A classifier model that was trained using one or more data samples in a target class is received, and a generative adversarial network (GAN) is trained to generate simulated data samples for the target class, comprising: generating a first simulated data sample using a generator model, computing a first discriminator loss by processing the first simulated data sample using a discriminator model, computing a classifier loss by processing the first simulated data sample using the classifier model, and refining the generator model based on the first discriminator loss and the classifier loss.

20 Claims, 8 Drawing Sheets

(56) References Cited

OTHER PUBLICATIONS

Zilong Lin et al., IDSGAN: Generative Adversarial Networks for Attack Generation against Intrusion Detection, Jun. 2019, Shool of Cyber Security, Shangai Jiao Tong University (Year: 2019).*
Kun Fang, "Classification Algorithm Optimization Based on Triple-GAN", 2020 (Year: 2020).*
Ian Goodfellow, Jean Pouget-Abadie, Mehdi Mirza, Bing Xu, David Warde-Farley, Sherjil Ozair, Aaron Courville, and Yoshua Bengio. "Generative Adversarial Nets". In Advances in Neural Information Processing Systems, pp. 2672-2680, 2014.
Xudong Mao, Qing Li, Haoran Xie, Raymond YK Lau, Zhen Wang, and Stephen Paul Smolley. "Least Squares Generative Adversarial Networks". In IEEE International Conference on Computer Vision, pp. 2794-2802, 2017.
Tim Salimans, Ian Goodfellow, Wojciech Zaremba, Vicki Cheung, Alec Radford, and Xi Chen. "Improved techniques for training GANs". In Advances in Neural Information Processing Systems, pp. 2234-2242, 2016.
Marc G. Bellemare, Ivo Danihelka, Will Dabney, Shakir Mohamed, Balaji Lakshminarayanan, Stephan Hoyer, and Remi Munos. "The Cramer Distance as a Solution to Biased Wasserstein Gradients". arXiv preprint arXiv:1705.10743, 2017.
Martin Arjovsky, Soumith Chintala, and Leon Bottou. "Wasserstein GAN". arXiv preprint arXiv:1701.07875, 2017.
Tim Salimans, Han Zhang, Alec Radford, and Dimitris Metaxas. "Improving GANs using Optimal transport", In International Conference on Learning Representations, 2018.
Jae Hyun Lim and Jong Chul Ye. "Geometric GAN". arXiv preprint arXiv:1705.02894, 2017.
Sebastian Nowozin, Botond Cseke, and Ryota Tomioka. "f-GAN: Training Generative Neural Samplers Using Variational Divergence Minimization". In Advances in Neural Information Processing Systems, pp. 271-279, 2016.
Naveen Kodali, Jacob Abernethy, James Hays, and Zsolt Kira. "On Convergence and Stability of GANs". arXiv preprint arXiv:1705.07215, 2017.
Ishaan Gulrajani, Faruk Ahmed, Martin Arjovsky, Vincent Dumoulin, and Aaron C. Courville. Improved Training of Wasserstein GANs. In Advances in Neural Information Processing Systems, pp. 5767-5777, 2017.
Takeru Miyato, Toshiki Kataoka, Masanori Koyama, and Yuichi Yoshida. "Spectral Normalization for Generative Adversarial Networks". arXiv preprint arXiv:1802.05957, 2018.
Han Zhang, Ian Goodfellow, Dimitris Metaxas, and Augustus Odena. "Self-attention Generative Adversarial Networks". arXiv preprint arXiv:1805.08318, 2018.
Lars Mescheder, Andreas Geiger, and Sebastian Nowozin. "Which Training Methods for GANs do Actually Converge"? arXiv preprint arXiv:1801.04406, 2018.
Tero Karras, Timo Aila, Samuli Laine, and Jaakko Lehtinen. "Progressive Growing of GANs for Improved Quality, Stability, and Variation". arXiv preprint arXiv:1710.10196, 2017.
Tero Karras, Samuli Laine, and Timo Aila. "A style-based generator architecture for generative adversarial networks". In IEEE Conference on Computer Vision and Pattern Recognition, pp. 4401-4410, 2019.
Mehdi Mirza and Simon Osindero. "Conditional generative adversarial nets". arXiv preprint arXiv:1411.1784, 2014.
Augustus Odena, Christopher Olah, and Jonathon Shlens. "Conditional image synthesis with auxiliary classifier GANs". In 34th International Conference on Machine Learning, pp. 2642-2651, 2017.
Mingming Gong, Yanwu Xu, Chunyuan Li, Kun Zhang, and Kayhan Batmanghelich. "Twin auxilary classifiers GAN". In Advances in Neural Information Processing Systems, pp. 1328-1337, 2019.
Takeru Miyato and Masanori Koyama. "cGANs with projection discriminator". In International Conference on Learning Representations, 2018.
Andrew Brock, Jeff Donahue, and Karen Simonyan. "Large scale gan training for high fidelity natural image synthesis". In International Conference on Learning Representations, 2019.
Dumitru Erhan, Yoshua Bengio, Aaron Courville, and Pascal Vincent. "Visualizing higher-layer features of a deep network". University of Montreal Tech Report, 2009.
Alexander Mordvintsev, Christopher Olah, and Mike Tyka. "Inceptionism: Going deeper into neural networks". Google Research Blog, 2015.
Aravindh Mahendran and Andrea Vedaldi. "Visualizing deep convolutional neural networks using natural pre-images". International Journal of Computer Vision, pp. 233-255, 2016.
Karen Simonyan, Andrea Vedaldi, and Andrew Zisserman. "Deep inside convolutional networks: Visualising image classification models and saliency maps". ICLR workshop, 2014.
Donglai Wei, Bolei Zhou, Antonio Torrabla, and William Freeman. "Understanding intra-class knowledge inside cnn" arXiv preprint arXiv:1507.02379, 2015.
Chris Olah, Alexander Mordvintsev, and Ludwig Schubert. "Feature visualization". Distill, 2017.
Alexey Dosovitskiy and Thomas Brox. "Generating images with perceptual similarity metrics based on deep networks". In Advances in Neural Information Processing Systems, pp. 658-666, 2016.
Anh Nguyen, Alexey Dosovitskiy, Jason Yosinski, Thomas Brox, and Jeff Clune. "Synthesizing the preferred inputs for neurons in neural networks via deep generator networks". In Advances in Neural Information Processing Systems, pp. 3387-3395, 2016.
Anh Nguyen, Jeff Clune, Yoshua Bengio, Alexey Dosovitskiy, and Jason Yosinski. "Plug & play generative networks: Conditional iterative generation of images in latent space". In IEEE conference on Computer Vision and Pattern Recognition, 2017.
Shibani Santurkar, Andrew Ilyas, Dimitris Tsipras, Logan Engstrom, Brandon Tran, and Aleksander Madry. "Image synthesis with a single (robust) classifier". In Advances in Neural Information Processing Systems, pp. 1260-1271, 2019.
Tsai, S. H. (2018). "Customizing an Adversarial Example Generator with Class-Conditional GANs".
Zhao, M., Cong, Y., & Carin, L. (Aug. 2020). "On Leveraging Pretrained GANs for Generation with Limited Data".
Lipton, Z. C., & Tripathi, S. (2017). "Precise Recovery of Latent Vectors from Generative Adversarial Networks".
Shang, C., Palmer, A., Sun, J., Chen, K. S., Lu, J., & Bi, J. (Dec. 2017). "VIGAN: Missing View Imputation with Generative Adversarial Networks". In 2017 IEEE International Conference on Big Data (Big Data) (pp. 766-775). IEEE.
Anonymous authors. (2019). "Recycling the Discriminator for Improving the Inference Mapping of GAN". Under review as a conference paper at ICLR 2019. Retrieved from https://openreview.net/pdf?id=HkgnpiR9Y7.
Li, A. H., Wang, Y., Chen, C., & Gao, J. (2020) "Decomposed Adversarial Learned Inference".
Anirudh, R., Thiagarajan, J. J., Kailkhura, B., & Bremer, T. (2018). "An Unsupervised Approach to Solving Inverse Problems using Generative Adversarial Networks".
Creswell, A., & Bharath, A.A. (2018). "Inverting the Generator of a Generative Adversarial Network". IEE transactions on neural networks and learning systems, 30(7), 1967-1974.
Zilong Lin et al. IDSGAN: "Generative Adversarial Network for Attack Generation against Intrusion Detection," Retrieved from the Internet: <URL: https://arxiv.org/pdf/1809.02077v3.pdf> (retrieved on Jan. 24, 2022) Jun. 16, 2019 (Jun. 16, 2019) pp. 2-5.
Congzheng Song et al., "Machine Learning Models that Remember Too Much," Retrieved from the Internet: <URL: https://arxiv.org/pdf/1709.07886.pdf>(retrieved on Jan. 24, 2022) Sep. 22, 2017(Sep. 22, 2017) section 5.2.
PCT, Notification of Transmittal of the International Search Report and the Written Opinion of the International Searching Authority, or the Declaration for Application PCT/CN2021/126353 dated Jan. 29, 2022.
Martin Arjovsky and Leon Bottou. Towards principled methods for training generative adversarial networks. In International Conference on Learning Representations, 2017.

(56) References Cited

OTHER PUBLICATIONS

David Berthelot, Thomas Schumm, and Luke Metz. Began: Boundary equilibrium generative adversarial networks. arXiv preprint arXiv:1703.10717, 2017.

Harm De Vries, Florian Strub, Jérémie Mary, Hugo Larochelle, Olivier Pietquin, and Aaron C. Courville. Modulating early visual processing by language. In Advances in Neural Information Processing Systems, pp. 6594-6604, 2017.

Emily L. Denton, Soumith Chintala, and Rob Fergus. Deep generative image models using a laplacian pyramid of adversarial networks. In Advances in Neural Information Processing Systems, pp. 1486-1494, 2015.

Vincent Dumoulin, Jonathon Shlens, and Manjunath Kudlur. A learned representation for artistic style. In International Conference on Learning Representations, 2017.

Logan Engstrom, Andrew Ilyas, Shibani Santurkar, and Dimitris Tsipras. Robustness (python library), 2019.

Martin Heusel, Hubert Ramsauer, Thomas Unterthiner, Bernhard Nessler, and Sepp Hochreiter. Gans trained by a two time-scale update rule converge to a local nash equilibrium. In Advances in Neural Information Processing Systems, pp. 6626-6637, 2017.

Andrew Ilyas, Shibani Santurkar, Dimitris Tsipras, Logan Engstrom, Brandon Tran, and Aleksander Madry. Adversarial examples are not bugs, they are features. In Advances in Neural Information Processing Systems, pp. 125-136, 2019.

Tero Karras, Samuli Laine, Miika Aittala, Janne Hellsten, Jaakko Lehtinen, and Timo Aila. Analyzing and improving the image quality of stylegan. arXiv preprint arXiv:1912.04958, 2019.

Alex Krizhevsky, Vinod Nair, and Geoffrey Hinton. The cifar-10 dataset. https://www.cs.toronto.edu/~kriz/cifar.html.

Mingming Gong, Yanwu Xu, Chunyuan Li, Kun Zhang, and Kayhan Batmanghelich. Twin auxilary classifiers gan. In Advances in Neural Information Processing Systems, pp. 1328-1337, Year: 2019.

Christian Szegedy, Wojciech Zaremba, Ilya Sutskever, Joan Bruna, Dumitru Erhan, Ian Goodfellow, and Rob Fergus. Intriguing properties of neural networks. arXiv preprint arXiv:1312.6199, 2013.

Japan Patent Office, "Notice of Reasons for Refusal," Feb. 4, 2025, 8 Pages, JP Application No. 2023-532392.

* cited by examiner

GENERATING DATA BASED ON PRE-TRAINED MODELS USING GENERATIVE ADVERSARIAL MODELS

BACKGROUND

The present disclosure relates to machine learning, and more specifically, to using generative adversarial models to analyze data used to train pre-trained models.

A wide variety of machine learning models, such as deep learning neural networks, have been trained and used in recent years for a variety of tasks. Generally, such models require a large amount of training data to operate effectively. In many typical developments, the model can be trained on a training dataset, and subsequently deployed for service after training. Often, the training data is decoupled from the model and is not available to those who use the trained model.

In many cases, it is desirable to recover the data on which the model was originally trained. For example, one may wish to recover data that has been accidentally deleted. Further, it may be desirable to recover such training data for evaluation in order to determine the quality of the model (e.g., whether sufficient training data was used). There are no existing techniques to extract the training data from a trained model.

In the field of generative adversarial networks (GANs), GANs have been used to generate data that follows the distribution of the provided training data. However, such models cannot generate data that is not included in the original distribution of the provided training data. Thus, a typical GAN network cannot recover or generate data that is unlike data it has already seen.

SUMMARY

According to one embodiment of the present disclosure, a method is provided. The method includes receiving a classifier model that was trained using one or more data samples in a target class; training a generative adversarial network (GAN) to generate simulated data samples for the target class, comprising: generating a first simulated data sample using a generator model; computing a first discriminator loss by processing the first simulated data sample using a discriminator model; computing a classifier loss by processing the first simulated data sample using the classifier model; and refining the generator model based on the first discriminator loss and the classifier loss. Advantageously, this trains the generator to generate data that simulates, approximates, or matches the training data for the target class. This recovery of such training data has a wide variety of applications.

According to some embodiments of the present disclosure, any combination of the above embodiments can further include techniques where the GAN is trained without processing any data samples in the target class. Advantageously, by training the GAN without processing the samples from the target class, the system can recover such data and enable an objective and detailed evaluation of the data and the classifier.

According to some embodiments of the present disclosure, any combination of the above embodiments can further include techniques where training the GAN further comprises: generating a second simulated data sample using the generator model; computing a second discriminator loss by processing the second simulated data sample using the discriminator model; and refining the discriminator model based on the second discriminator loss. One advantage of such an embodiment is that the discriminator model is refined to better distinguish the real and simulated samples, which allows it to put pressure on the generator model to provide more accurate simulated data.

According to some embodiments of the present disclosure, any combination of the above embodiments can further include techniques where the discriminator model is trained to differentiate between simulated data samples generated by the generator model and data samples used to train the classifier model. Advantageously, such an embodiment allows the discriminator to train effectively to ensure that the generator produces accurate data that can be used to approximate the unseen training data.

According to some embodiments of the present disclosure, any combination of the above embodiments can further include techniques where a first simulated data sample is generated for the target class by providing the generator model with a randomized input vector. Advantageously, this generation of simulated data for an entirely unseen class can allow the GAN to replicate the original training data to improve evaluation and analysis.

According to some embodiments of the present disclosure, any combination of the above embodiments can further include techniques where it is determined that the classifier model was trained with insufficient data samples in the target class based at least in part on the first simulated data sample. Advantageously, such an embodiment allows the pre-trained classifier of unknown or uncertain quality to be objectively evaluated in order to improve the operations of the entire ecosystem.

According to some embodiments of the present disclosure, any combination of the above embodiments can further include techniques where it is determined that the data samples in the target class used to train the classifier model included one or more suspicious features based at least in part on the first simulated data sample. Advantageously, such an embodiment allows the pre-trained classifier of unknown or uncertain quality to be objectively evaluated in order to improve the operations of the entire ecosystem.

According to a different embodiment of the present disclosure, any combination of the above-discussed embodiments can be implemented by one or more computer-readable storage media. The computer-readable storage media collectively contain computer program code that, when executed by operation of one or more computer processors, performs an operation. In embodiments, the operation performed can correspond to any combination of the above methods and embodiments.

According to yet another different embodiment of the present disclosure, any combination of the above-discussed embodiments can be implemented by a system. The system includes one or more computer processors, and one or more memories collectively containing a program which, when executed by the one or more computer processors, performs an operation. In embodiments, the operation performed can correspond to any combination of the above methods and embodiments.

DETAILED DESCRIPTION

Figure 1:
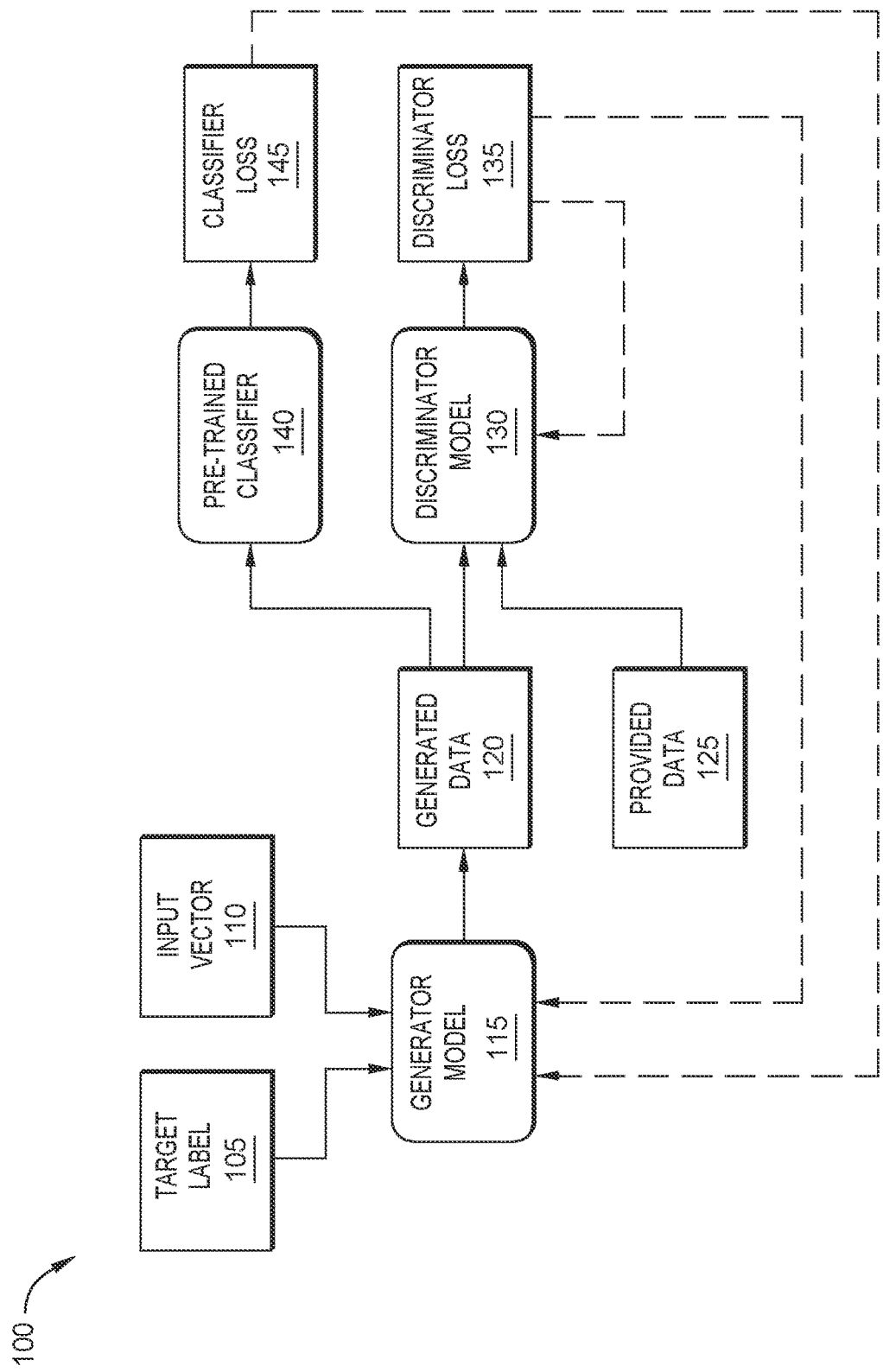
FIG. 1 depicts a workflow for training a generative adversarial model to rediscover training data for a pre-trained classifier, according to some embodiments disclosed herein.

Embodiments of the present disclosure provide techniques to train generator models to recover training data from pre-trained models. In one embodiment, given a trained classifier, the generator model can be trained to generate data that approximates data used to train the classifier originally. This allows for recovery of such data. Additionally, in some embodiments, the recovered or simulated data can be analyzed to determine the quality of the pre-trained classifier and/or its training data. For example, in some embodiments, techniques described herein can be used to determine whether sufficient training data was used, whether spurious features were relied upon, whether the training process was poisoned, and the like.

Some embodiments disclosed herein provide techniques to train generator models to generate images conditional on some target class whose real images were used to train a pre-trained model, but whose real images are completely unseen during training of the generator. Although images are used in some examples herein, embodiments of the present disclosure are readily applicable to any type of training data and any type of pre-trained machine learning model. In an embodiment, the generator model can be trained using a pre-trained image classifier that can distinguish the target class, and a set of generic images that does not contain images from the target class. For example, suppose a classifier is trained to classify images based on the animals contained therein, and the target class is horses. In some embodiments, of the present disclosure, a generator model can be trained using the classifier and one or more images from other classes (e.g., dogs) to generate images of horses that approximate or simulate images used to originally train the classifier. Notably, the generator is trained to do so without ever processing or receiving any samples from the target class (e.g., no pictures of horses).

In some embodiments of the present disclosure, this generated data can be analyzed to evaluate and determine the quality of the data and/or of the pre-trained model. For example, if the generated images include some feature in common (or lack some feature), it can be inferred that the underlying classifier relied on (or did not rely on) that feature. As an example, suppose the generator, when tasked with generating images for a "primate" class, produces images that appear to depict primates, but without faces. In an embodiment, it can be determined or inferred that the classifier is not relying on the faces in the training images to learn to classify primates. Similarly, if the generated images all appear to include forests or trees, it can be determined or inferred that the classifier is relying on the presence of such trees to classify primates, rather than on the features of the primate itself.

As another example, suppose some or all of the generated images each include some suspect or suspicious feature (such as a black square in the corner of each image). This may indicate that the classifier was trained using poisoned data where the suspicious feature acts a trigger that causes the classifier to classify images including the trigger into the target class regardless of what the image actually depicts. Further, in some embodiments, if the generated images do not appear to depict a consistent representation of the target class (e.g., there are not recognizable horses in the generated images), one can infer that an insufficient number or variety of training samples were used for the target class, or that the classifier is relying on unclear or improper features. In embodiments, these and other insights can allow for improved training and understanding of the underlying classifier model. For example, one may collect more training samples and/or better training samples that include desired features and/or do not include undesired features, to remove poisoned samples, and the like.

FIG. 1 depicts a workflow 100 for training a generative adversarial model to rediscover training data for a pre-trained classifier, according to some embodiments disclosed herein. In the illustrated workflow 100, a Pre-Trained Classifier 140 and Provided Data 125 are used to train a generative adversarial model in order to generate simulated data that represents or approximates other data used to train the Pre-Trained Classifier 140. In an embodiment, the Pre-Trained Classifier 140 is a classifier machine learning model that has been trained using a set of training exemplars to classify input data (e.g., images) into classes. For example, the Pre-Trained Classifier 140 may be trained to categorize input images into classes based on the animals depicted in the images.

In the illustrated embodiment, the Provided Data 125 includes one or more training samples used to train the Pre-Trained Classifier 140. In at least one embodiment, however, the Provided Data 125 does not include any exemplars for a target class for which the generative adversarial model is being trained. That is, the GAN (including the Generator Model 115 and the Discriminator Model 130) may be trained without processing any samples from the target class. For example, suppose the Pre-Trained Classifier 140 is trained based on exemplars for a "primate" class, a "horse" class, and a "dog" class. In an embodiment, if the target class is "horse," the Provided Data 125 may include exemplars from the "primate" class and/or the "dog" class, but does not include any examples from the "horse" class.

In some embodiments, the Provided Data 125 includes one or more exemplars from all classes other than the target class. In other embodiments, the Provided Data 125 excludes any exemplars from the target class, and may or may not have samples from every other class. In some embodiments, the Provided Data 125 includes samples that were actually used to train the Pre-Trained Classifier 140. In other embodiments, the Provided Data 125 may include labeled data that corresponds to the non-target classes, but that was not actually used to train the Pre-Trained Classifier 140.

In the illustrated workflow 100, the Target Label 105 and an Input Vector 110 are provided to a Generator Model 115. In one embodiment, the Generator Model 115 is a generator neural network of a GAN. The Generator Model 115 is generally trained to produce Generated Data 120 based on the Input Vector 110, where the Generated Data 120 is intended to belong to the class associated with the Target Label 105. In some embodiments, the Generator Model 115 receives the Input Vector 110, but does not actually receive or process the Target Label 105. That is, the Generator Model 115 may be trained to generate Generated Data 120 based only on the Input Vector 110.

In at least one embodiment, the Input Vector 110 is a randomized vector used as input to the Generator Model 115. Generally, changing the Input Vector 110 results in a different output of Generated Data 120. During training, the Generator Model 115 learns to produce Generated Data 120 that approximates or matches the Target Label 105, as discussed in more detail below.

As illustrated, the Generated Data 120 is then provided to a Discriminator Model 130. In one embodiment, the Discriminator Model 130 is a discriminator neural network of a GAN. Generally, the Discriminator 130 is trained to distinguish true input data (e.g., Provided Data 125) from simulated data created by the Generator Model 115 (e.g., Generated Data 120). That is, the Generator Model 115 may learn to generate Generated Data 120 that approximates, matches, or simulates the Provided Data 125, while the Discriminator Model 130 learns to distinguish Generated Data 120 from Provided Data 125.

In the illustrated workflow 100, based on the Generated Data 120 and/or Provided Data 125, the system computes a Discriminator Loss 135. In one embodiment, this Discriminator Loss 135 is determined based on whether the Discriminator Model 130 accurately classified the input as Generated Data 120 or Provided Data 125. For example, if the Discriminator Model 130 mistakenly classifies Generated Data 120 as real Provided Data 125 (or mistakenly classifies Provided Data 125 as simulated Generated Data 120), the Discriminator Loss 135 may be greater than if the Discriminator Model 130 accurately classified the input. As illustrated, this Discriminator Loss 135 is then used to refine the weights or parameters of the Discriminator Model 130 such that it more accurately distinguishes the real and simulated data. By iteratively processing multiple inputs of Generated Data 120 and/or Provided Data 125, the Discriminator Model 130 iteratively learns to distinguish the two.

As illustrated, the Generated Data 120 is also provided to the Pre-Trained Classifier 140 to generate a Classifier Loss 145. In an embodiment, the Classifier Loss 145 is computed based on the difference between the output of the Pre-Trained Classifier 140 and the Target Label 105. For example, suppose the target class (and therefore the Target Label 105) is "dog." If the Pre-Trained Classifier 140 classifies the Generated Data 120 as "dog," the Classifier Loss 145 may be lower than if the Pre-Trained Classifier 140 classified it as "horse." In the illustrated embodiment, both the Classifier Loss 145 and the Discriminator Loss 135 are used to refine the Generator Model 115. This allows the Generator Model 115 to iteratively learn to generate better Generated Data 120 that more closely represents the Target Label 105. That is, the Discriminator Loss 135 may force the Generator Model 115 to generate Generated Data 120 that is similar to the Provided Data 125, while the Classifier Loss 145 causes the Generator Model 115 to generate Generated Data 120 that is specific to the Target Label 105.

In embodiments, during the training process, the internal weights and parameters of the Generator Model 115 and Discriminator Model 130 may be refined, while the Pre-Trained Classifier 140 remains unchanged. Once the training is complete, the Generator Model 115 may be deployed to produce Generated Data 120 that approximates or represents the Target Label 105. Such generated data can be evaluated using a variety of techniques to determine the quality or other characteristics of the Pre-Trained Classifier 140.

Figure 2:
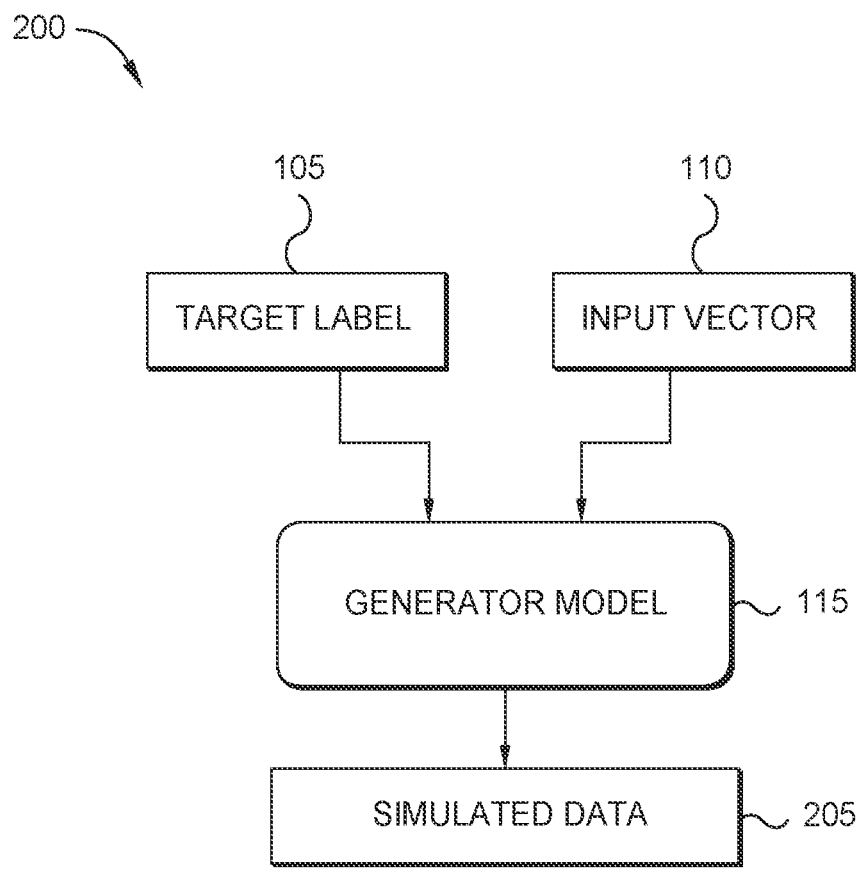
FIG. 2 depicts a workflow for using a generative adversarial network to generate simulated training data approximating data used to train a pre-trained classifier, according to some embodiments disclosed herein.

FIG. 2 depicts a workflow 200 for using a generative adversarial network to generate simulated training data approximating data used to train a pre-trained classifier, according to some embodiments disclosed herein. Specifically, the workflow 200 depicts use of a Generator Model 115 after it has been trained (e.g., using the workflow 100 in FIG. 1). In the illustrated embodiment, the Generator Model 115 receives a Target Label 105 and/or Input Vector 110, and generates Simulated Data 205.

In some embodiments, as discussed above, the Generator Model 115 does not receive the Target Label 105. Instead, the Generator Model 115 may be trained to generate the Simulated Data 205 for the target class as discussed above (e.g., based in part on a classifier loss that is computed based on the Target Label 105). In such an embodiment, the Generator Model 115 need only receive an Input Vector 110 to create Simulated Data 205 that matches the Target Label 105.

In an embodiment, the Simulated Data 205 reflects exemplars from the target class. By providing different Input Vectors 110, different exemplars for the target class can be generated. In some embodiments, the Input Vectors 110 are created using a random or pseudo-random algorithm. In some embodiments, a set of Simulated Data 205 can be generated using a set of Input Vectors 110. This Simulated Data 205 can then be evaluated or analyzed to determine the quality of the Pre-Trained Classifier 140. In embodiments, this evaluation may be automatic (e.g., performed by one or more computers), manual (e.g., performed by human reviewers), or a combination of the two.

For example, if the Simulated Data 205 does not appear to have similar features or does not appear to reflect the Target Label 105, it may be determined or inferred that the Pre-Trained Classifier 140 was not trained with sufficient data for the target class. In one such embodiment, the Pre-Trained Classifier 140 can be refined with additional samples for the target class.

Similarly, if all or a portion of the Simulated Data 205 includes features that are not relevant to the Target Label 105 (e.g., trees when the label is "primate"), it may be determined or inferred that the Pre-Trained Classifier 140 is relying on irrelevant features when classifying the target class. In one such embodiment, the Pre-Trained Classifier 140 may be trained or refined with better samples that do not include this feature (e.g., images of primates that do not include trees) in order to allow the model to learn to predict the class more accurately.

Additionally, if all or a portion of the Simulated Data 205 lack a feature that is relevant to or would be useful to classify the Target Label 105 (e.g., faces for a "primate" class), it may be determined or inferred that the Pre-Trained Classifier 140 is not relying on such features when classifying the target class. In one such embodiment, the Pre-Trained Classifier 140 may be trained or refined with better samples that do include this feature (e.g., images of primate faces) in order to allow the model to learn to predict the class more accurately.

As another example, if all or a portion of the Simulated Data 205 includes a feature that appears to be suspicious or illegitimate, it may be determined or inferred that the Pre-Trained Classifier 140 was trained using poisoned data for at least the target class. As used herein, a feature may be considered suspicious if it does not reflect a legitimate or realistic feature of input data. For example, one suspicious feature may be the presence of colored squares in particular locations of the generated images, such as the corners. Such a feature is unlikely to have been included by mistake (e.g., because the training samples should not have included such a feature), and therefore may be have been included maliciously (e.g., to trick the Pre-Trained Classifier 140 to rely on these trigger features, rather than legitimate features in the input). In one such embodiment, the Pre-Trained Classifier 140 may be trained or refined with better samples that do include this trigger feature, or may be re-trained without the original training data for the target class (which may be poisoned) in order to allow the model to learn to predict the class more accurately.

Figure 3:
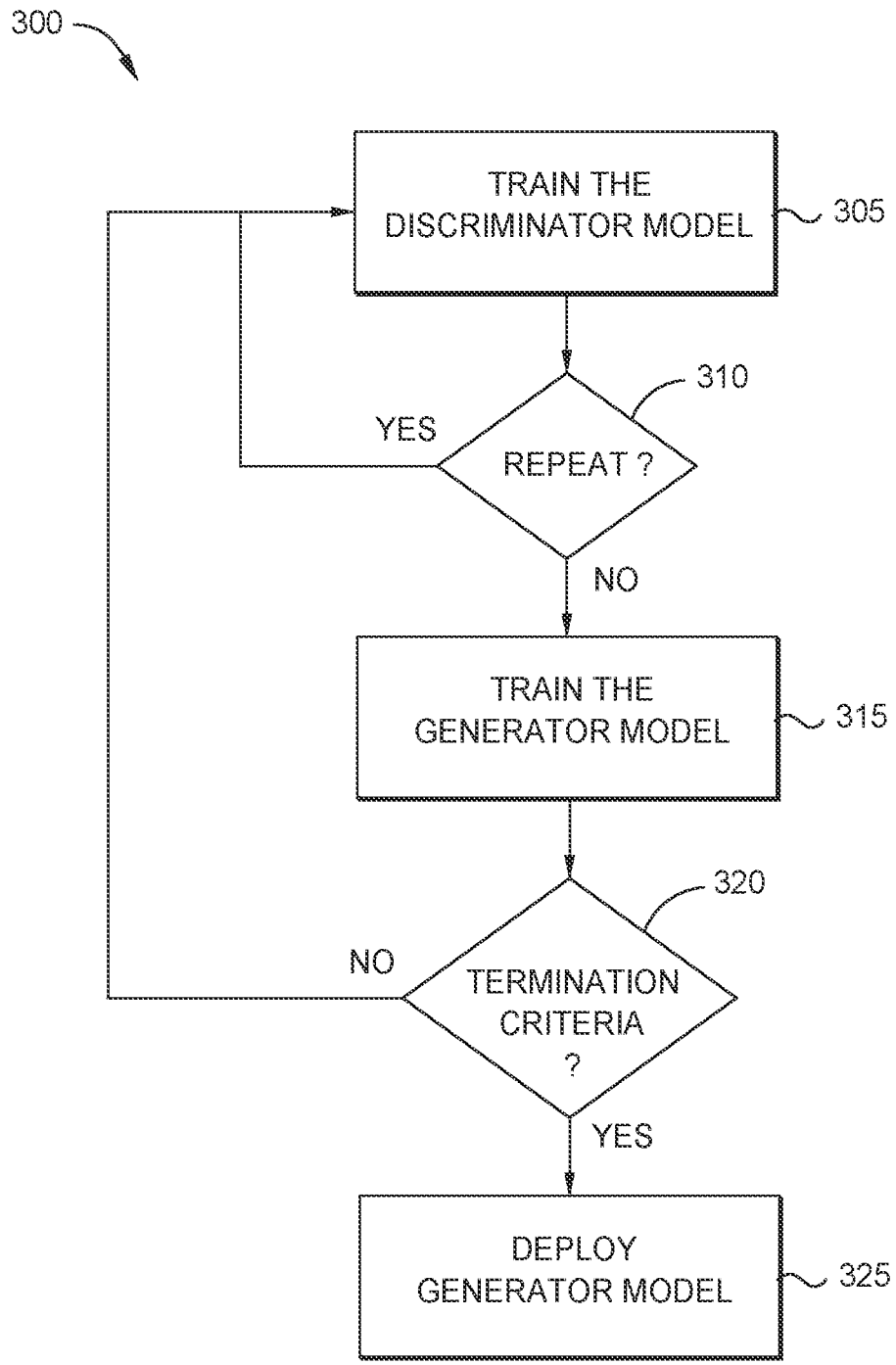
FIG. 3 is a flow diagram illustrating a method of training a generator model to generate simulated training data based on a pre-trained model, according to some embodiments disclosed herein.

FIG. 3 is a flow diagram illustrating a method 300 of training a generator model to generate simulated training data based on a pre-trained model, according to some embodiments disclosed herein. As illustrated, the method 300 begins at block 305, when the system trains a discriminator model based one or more samples. In an embodiment, this may generally include providing data generated by a generator model, actual data used to train the classifier model, or both as input to the discriminator. Based on this input, the discriminator model outputs a label indicating whether the input is real or simulated. By comparing this output to the actual classification of the input (as real or simulated), the system can generate a discriminator loss, which may be used to refine the discriminator model (e.g., via backpropagation).

In an embodiment, this training may be performed sequentially on individual records, or in batches. At block 310, the system determines whether training of the discriminator model should be repeated (e.g., whether additional samples and/or batches remain to be used in this epoch). If so, the method 300 returns to block 305. If not, the method 300 continues to block 315.

At block 315, the system trains the generator model using one or more samples. In an embodiment, this generally includes providing some input vector to the generator model in order to generate a simulated piece of output data. This simulated data is then provided to the pre-trained classifier to output a predicted label, and the predicted label can be compared to the target label to compute a classifier loss. This classifier loss can be used to refine the weights or parameters of the generator model (e.g., via backpropagation). In some embodiments, the simulated data is also provided to the discriminator, and a discriminator loss can be computed. This discriminator loss may also be used to refine the generator model (e.g., via backpropagation). In one embodiment, the generator model is refined based on the aggregate of the classifier loss and discriminator loss (e.g., the sum of the individual losses).

At block 315, this process may be performed sequentially for one or more samples, or may be performed as a batch. The method 300 then continues to block 320, where the system determines whether one or more termination criteria have been satisfied. This termination criteria may include, for example, a minimum level of accuracy for the discriminator and/or generator (e.g., a percentage of times the generator creates data that the fools the discriminator and/or is accurately classified into the target label by the classifier). In some embodiments, the termination criteria may include an amount of time spent training the models, a number of cycles or batches that have been completed, whether any real data (e.g., Provided Data 125) remains to be processed, and the like.

If the termination criteria are not satisfied, the method 300 returns to block 305. In this way, the method 300 iterates to train the generator and discriminator in tandem. If the termination criteria are satisfied, the method 300 continues to block 325. At block 325, the generator model is deployed for use. For example, the generator model may be used to generate simulated data during runtime in order to investigate the target class and recover or approximate training data used to train the pre-trained classifier.

Figure 4:
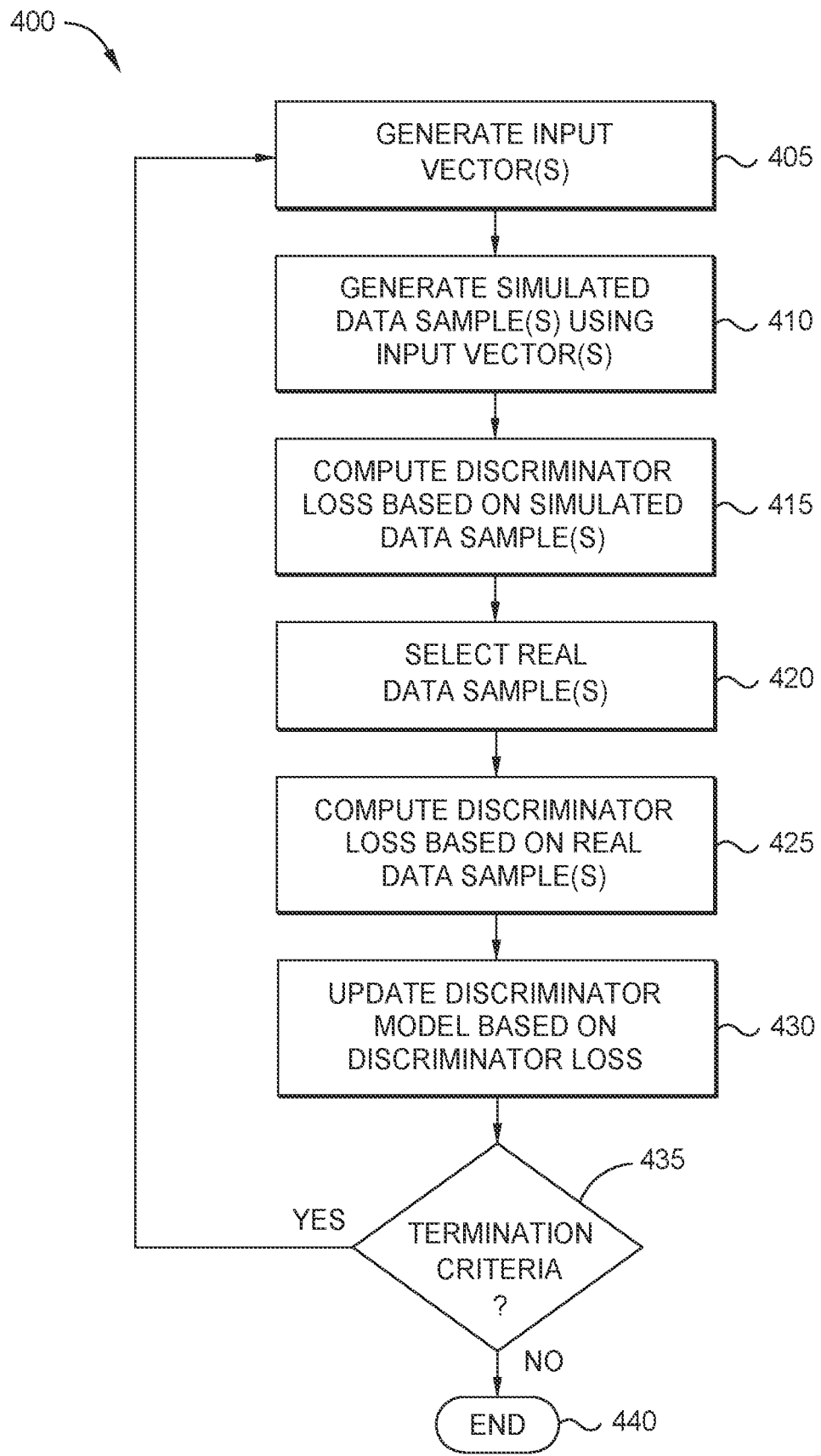
FIG. 4 is a flow diagram illustrating a method of training a discriminator model to aid rediscovery of training data from a pre-trained model, according to some embodiments disclosed herein.

FIG. 4 is a flow diagram illustrating a method 400 of training a discriminator model to aid rediscovery of training data from a pre-trained model, according to some embodiments disclosed herein. In one embodiment, the method 400 provides additional detail for block 305 in FIG. 3. The method 400 begins at block 405, where the system generates one or more input vectors to be used to train the discriminator. In some embodiments, these input vectors are generated randomly.

The method 400 then continues to block 410, where the system generates one or more simulated data samples using the input vectors. For example, the system may provide the input vector(s) to a generator model (which may be fully trained, partially trained, or untrained). The generator model can output a simulated data sample for each input vector. In some embodiments, the generator model is initialized with random weights or parameters, such that the simulated data samples may, at least initially, be relatively random and unrealistic. However, over time, the generator learns to generate more accurate data samples.

At block 415, the system computes a discriminator loss based on the simulated data sample(s). In one embodiment, this includes providing the simulated data sample(s) to a discriminator model, which attempts to classify them as real or simulated. The loss may be computed based on whether the discriminator is correct. This loss may then be used to refine the weights or parameters of the discriminator model, such that it can more accurately distinguish between real and simulated data samples.

The method 400 then continues to block 420, where the system selects one or more real data samples. In one embodiment, these real data samples reflect training samples that were actually used to train the pre-trained classifier. In another embodiment, they reflect actual input data (e.g., actual images) that could be used to train or refine the classifier, even if they were not actually used to do so. At block 425, the system computes a discriminator loss based on these real data sample(s). In one embodiment, as discussed above, this includes providing the real data sample(s) to the discriminator model, which attempts to classify them as real or simulated. The loss may be computed based on whether the discriminator is correct. This loss may then be used to refine the weights or parameters of the discriminator model, such that it can more accurately distinguish between real and simulated data samples.

The method 400 then proceeds to block 430, where the system updates the discriminator model based on the above-computed discriminator losses. For example, the system may use backpropagation to update one or more internal weights of the discriminator model. By iteratively computing loss using different simulated and real samples, the discriminator iteratively learns to more-accurately distinguish between real and simulated data.

At block 435, the system determines whether some termination criteria are satisfied. In some embodiments, this includes determining whether the discriminator model has been trained on a sufficient number of samples for the current round or epoch of training. In at least one embodiment, the system determines an accuracy of the discriminator, and determines whether the termination criteria are satisfied based on this accuracy. For example, if the discriminator is correct less than half the time (e.g., worse than a coin flip), the system may determine that additional training is needed. If the termination criteria are not satisfied, the method 400 returns to block 405. Otherwise, the method 400 terminates at block 440. In some embodiments, the system can then begin training the generator model.

Figure 5:
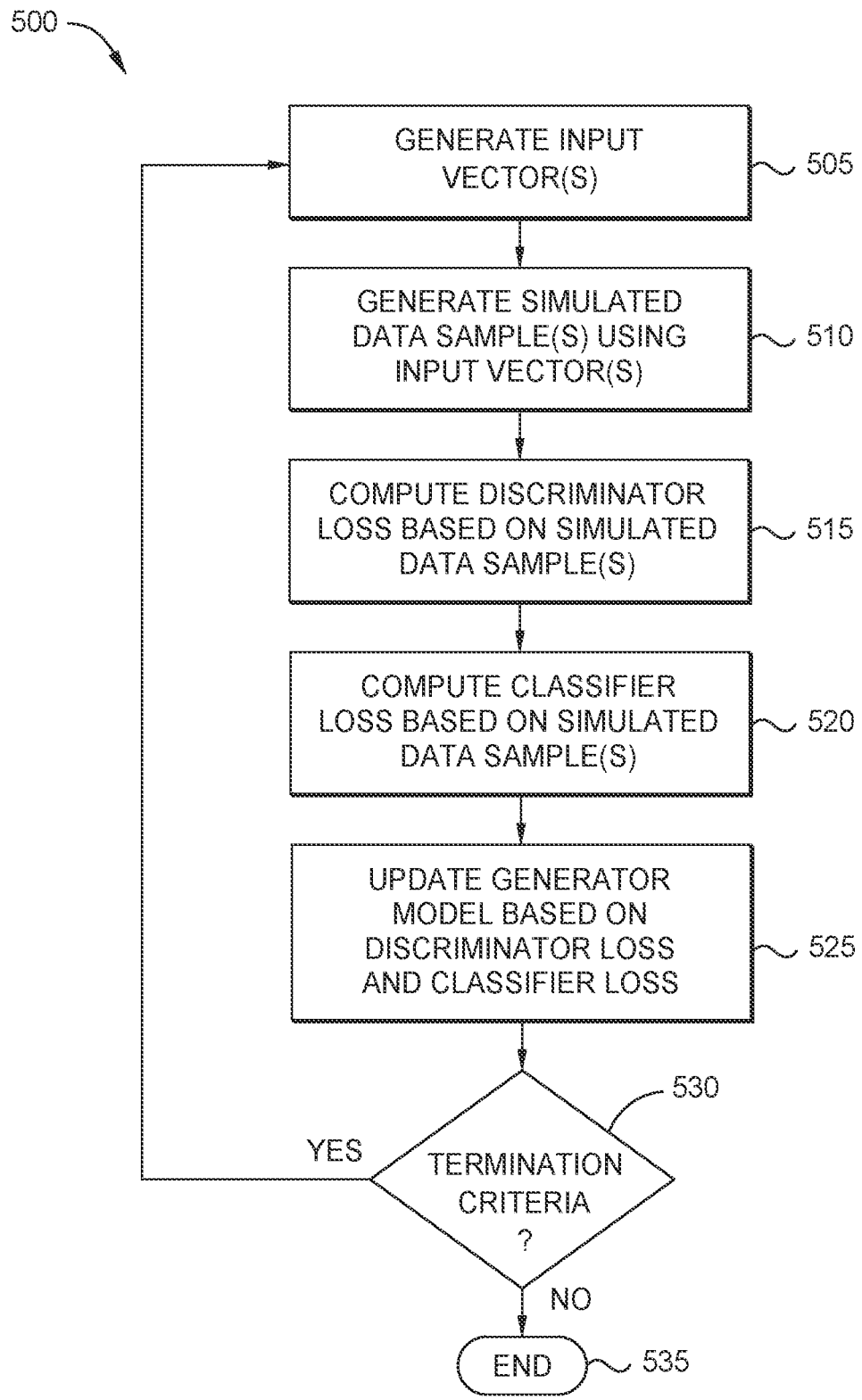
FIG. 5 is a flow diagram illustrating a method of training a generator model to aid rediscovery of training data from a pre-trained model, according to some embodiments disclosed herein.

FIG. 5 is a flow diagram illustrating a method 500 of training a generator model to aid rediscovery of training data from a pre-trained model, according to some embodiments disclosed herein. In one embodiment, the method 500 provides additional detail for block 315 in FIG. 3. The method 500 begins at block 505, where the system generates one or more input vectors. In some embodiments, these are the same input vectors used above to train the discriminator model. In other embodiments, the system generates new input vectors (e.g., randomly).

The method 500 then continues to block 510, where the system generates one or more simulated data samples using the input vectors. For example, the system may provide the input vector(s) to a generator model (which may be fully trained, partially trained, or untrained). The generator model can output a simulated data sample for each input vector. In some embodiments, the generator model is initialized with random weights or parameters, such that the simulated data samples may, at least initially, be relatively random and unrealistic. However, over time, the generator learns to generate more accurate data samples.

At block 515, the system computes a discriminator loss based on the simulated data sample(s). In one embodiment, this includes providing the simulated data sample(s) to a discriminator model, which attempts to classify them as real or simulated. The loss may be computed based on whether the discriminator is correct. This loss may subsequently be used to refine the weights or parameters of the generator model, as discussed in more detail below.

The method 500 then continues to block 520, where the system computes a classifier loss based on the simulated data samples. In one embodiment, this includes providing the simulated data sample(s) to the pre-trained classifier model, which classifies them into a class or category based on its prior training. In an embodiment, the classifier loss may be computed based on whether the simulated data samples are classified into the target class. This loss may subsequently be used to refine the weights or parameters of the generator model, as discussed in more detail below.

The method 500 then proceeds to block 525, where the system updates the generator model based on the above-computed discriminator and generator losses. For example, the system may use backpropagation to update one or more internal weights of the generator model. By iteratively doing so, the generator iteratively learns to generate simulated data that more-accurately reflects or represents real data (because of the discriminator loss) for the target class (because of the classifier loss).

At block 530, the system determines whether some termination criteria are satisfied. In some embodiments, this includes determining whether the generator model has been trained on a sufficient number of samples for the current round or epoch of training. In at least one embodiment, the system determines an accuracy of the generator, and determines whether the termination criteria are satisfied based on this accuracy. For example, if the simulated data is classified into the target class a predefined percentage of time, the system may determine that additional training is not needed. Similarly, if the discriminator is fooled a predefined percentage of the time, the system may determine that further training is not needed at this time. If the termination criteria are not satisfied, the method 500 returns to block 505. Otherwise, the method 500 terminates at block 535. In some embodiments, the system can then deploy the trained generator model, or may begin to further refine the discriminator (e.g., using the method 400).

Figure 6:
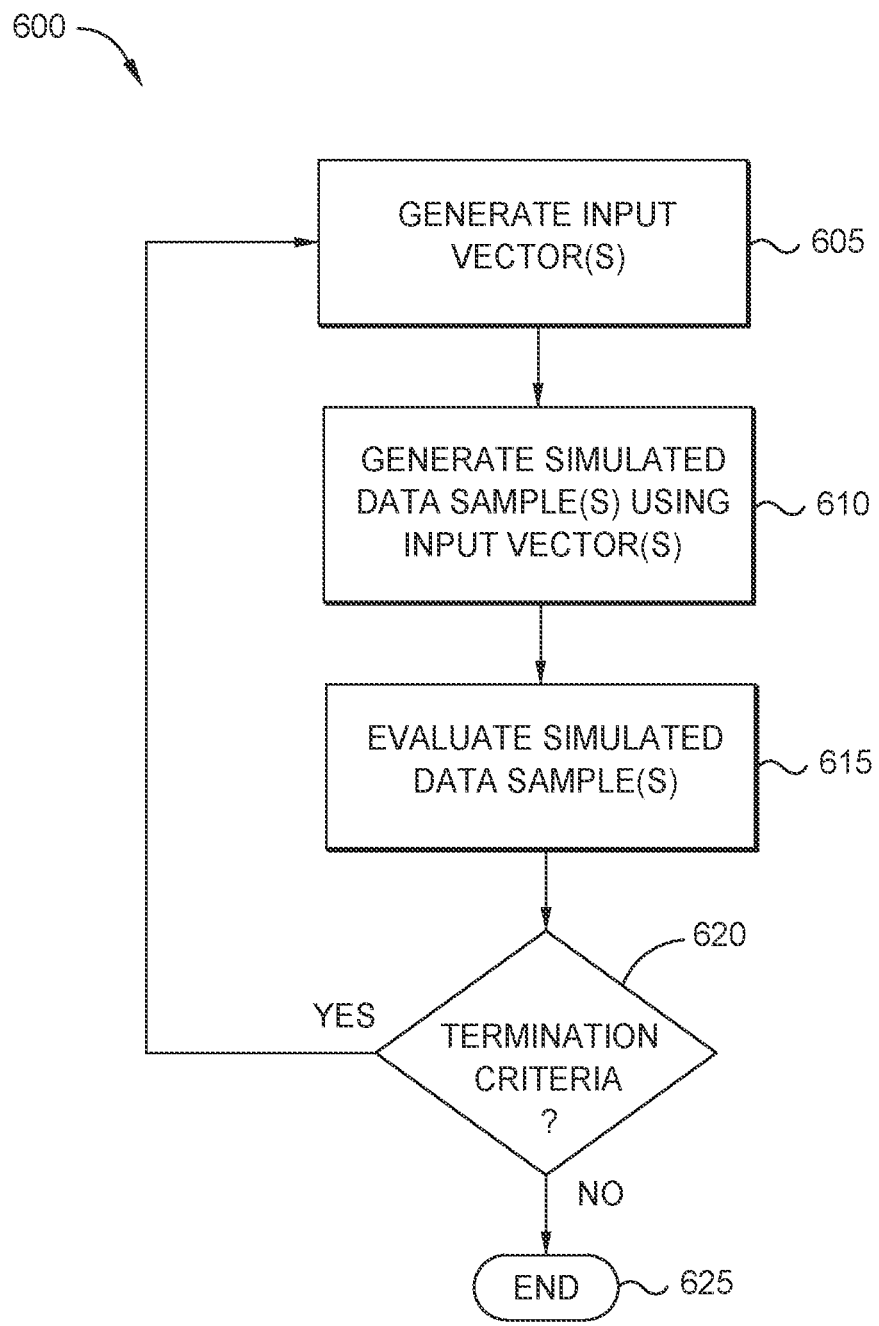
FIG. 6 is a flow diagram illustrating a method of generating and evaluating training data for a pre-trained model, according to some embodiments disclosed herein.

FIG. 6 is a flow diagram illustrating a method of generating and evaluating training data for a pre-trained model, according to some embodiments disclosed herein. In one embodiment, the method 600 may be utilized after the generator model is fully trained to generate simulated data samples that correspond to the target class. The method 600 begins at block 605, where the system generates or receives one or more input vectors. As discussed above, these input vectors may be randomly generated.

At block 610, the system generates one or more simulated data samples based on the input vectors. For example, the system may provide the input vectors to the generator model, which outputs a corresponding simulated data sample for each input vector. The method 600 then continues to block 615, where the simulated data samples are evaluated. This may include, as discussed above, identifying features that are shared across the simulated data samples, identifying features that are absent from the simulated data samples, and the like.

For example, the features which are present (or absent) from the simulated data samples can be used to determine or infer what features the underlying pre-trained classifier is actually relying on. Similarly, in some embodiments, if the simulated data samples do not appear to depict the target class, one may determine or infer that the underlying classifier is not particularly accurate for the class, and/or was trained on insufficient data for the class.

Based on the results of this analysis, a variety of steps can be taken. This may include, for example, collecting and/or using additional training data for the target class, refraining from using the classifier model in production, and the like.

The method 600 then continues to block 620, where the system determines whether one or more termination criteria are satisfied. This may include, for example, a number of simulated data samples that should be generated, determining whether a user has initiated another round (or has terminated the process), and the like. If the criteria are not satisfied, the method 600 returns to block 605. Otherwise, the method 600 terminates at block 625.

Figure 7:
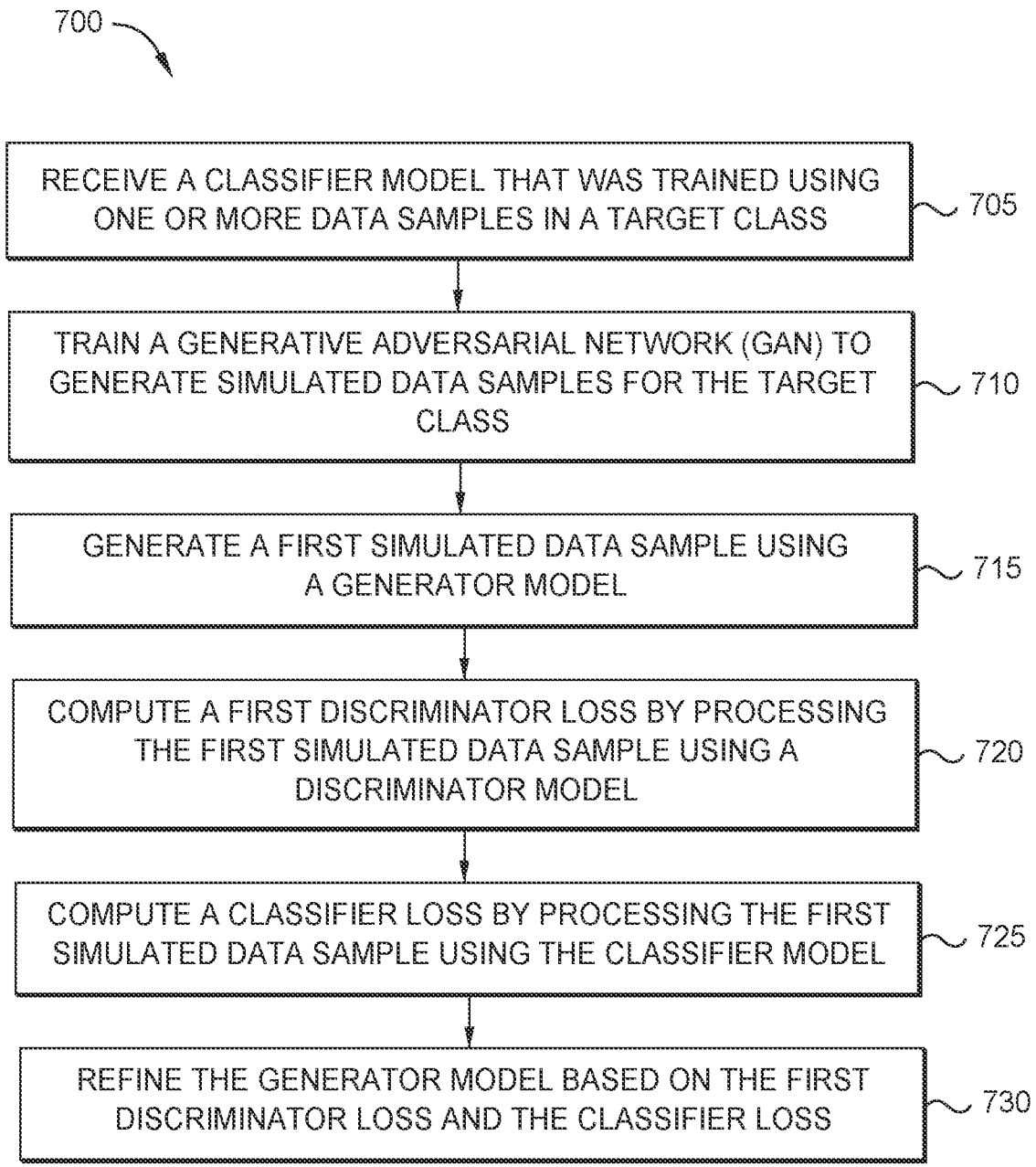
FIG. 7 is a flow diagram illustrating a method of training a generator model based on a pre-trained classifier model, according to some embodiments disclosed herein.

FIG. 7 is a flow diagram illustrating a method 700 of training a generator model based on a pre-trained classifier model, according to some embodiments disclosed herein. The method 700 begins at block 705, where the system receives a classifier model that was trained using one or more data samples in a target class. At block 710, the system trains a generative adversarial network (GAN) to generate simulated data samples for the target class. The method 700 then continues to block 715, where the system generates a first simulated data sample using a generator model. At block 720, the system computes a first discriminator loss by processing the first simulated data sample using a discriminator model. Further, at block 725, the system computes a classifier loss by processing the first simulated data sample using the classifier model. The method 700 then continues to block 730, where the system refines the generator model based on the first discriminator loss and the classifier loss.

Figure 8:
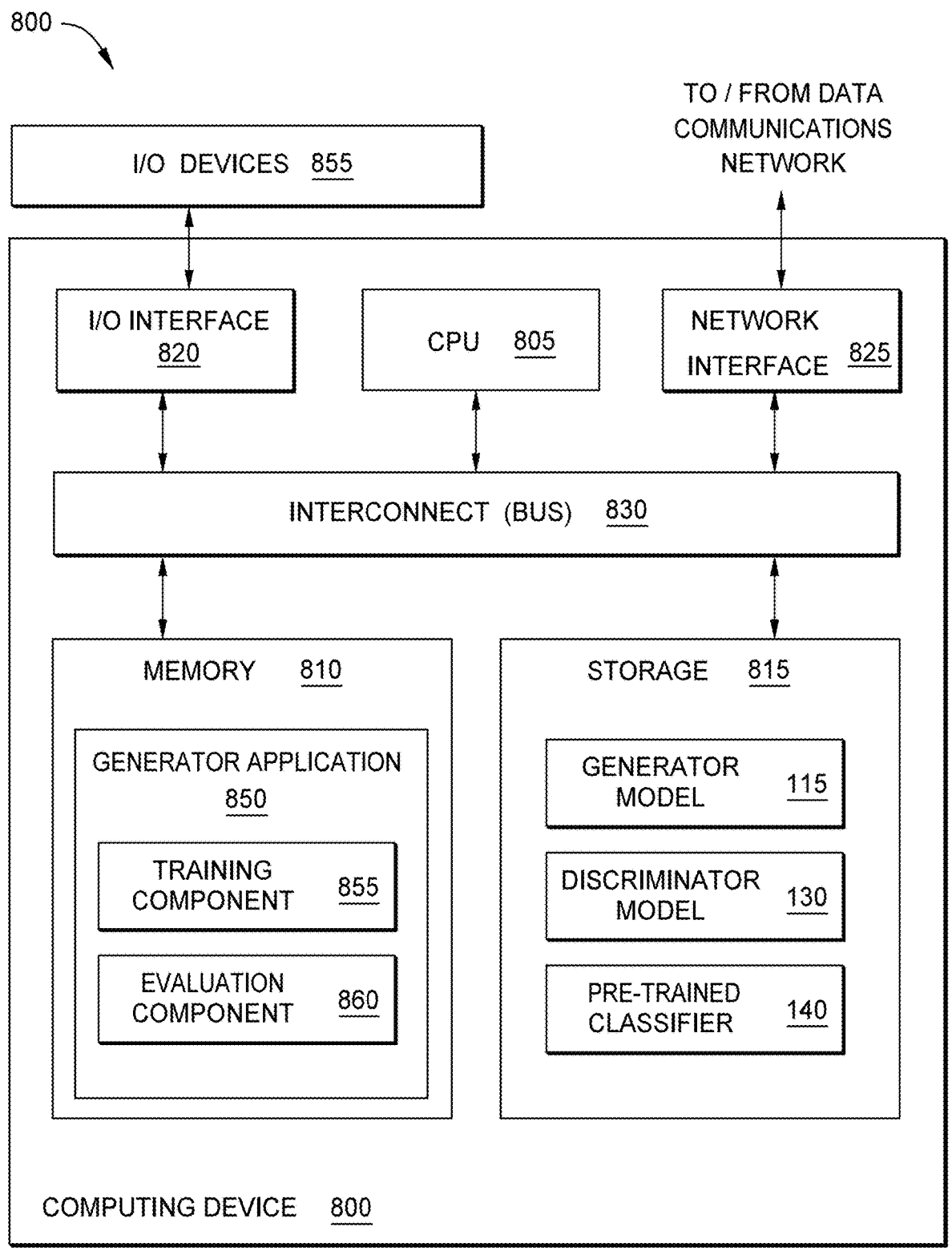
FIG. 8 is a block diagram illustrating a computing device configured to train generator models based on pre-trained classifiers, according to some embodiments disclosed herein.

FIG. 8 is a block diagram illustrating a Computing Device 800 configured to train generator models based on pre-trained classifiers, according to some embodiments disclosed herein. Although depicted as a physical device, in embodiments, the Computing Device 800 may be implemented using virtual device(s), and/or across a number of devices (e.g., in a cloud environment). As illustrated, the Computing Device 800 includes a CPU 805, Memory 810, Storage 815, a Network Interface 825, and one or more I/O Interfaces 820. In the illustrated embodiment, the CPU 805 retrieves and executes programming instructions stored in Memory 810, as well as stores and retrieves application data residing in Storage 815. The CPU 805 is generally representative of a single CPU and/or GPU, multiple CPUs and/or GPUs, a single CPU and/or GPU having multiple processing cores, and the like. The Memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 855 (such as keyboards, monitors, etc.) are connected via the I/O Interface(s) 820. Further, via the Network Interface 825, the Computing Device 800 can be communicatively coupled with one or more other devices and components (e.g., via a network, which may include the Internet, local network(s), and the like). As illustrated, the CPU 805, Memory 810, Storage 815, Network Interface(s) 825, and I/O Interface(s) 820 are communicatively coupled by one or more Buses 830.

In the illustrated embodiment, the Storage 815 includes a Generator Model 115, Discriminator Model 130, and Pre-Trained Classifier 140. Although depicted as residing in Storage 815, in embodiments, the Generator Model 115, Discriminator Model 130, Pre-Trained Classifier 140 may reside in any suitable location. The Pre-Trained Classifier 140 is a machine learning model that has been trained to classify input data into one or more categories or classes. For example, the Pre-Trained Classifier 140 may categorize images into classes based on the objects or animals depicted in the images. Generally, the Pre-Trained Classifier 140 is trained using labeled exemplars or data samples (e.g., images, each associated with labels indicating the content of the image).

In an embodiment, the Generator Model 115 and Discriminator Model 130 form a GAN. The Generator Model 115 is a machine learning model (e.g., a neural network) trained to generate simulated data that approximates all or a portion of the data samples used to train the Pre-Trained Classifier 140. In one embodiment, the Generator Model 115 is trained to generate simulated data for a particular class of data the Pre-Trained Classifier 140 has been trained for.

Generally, the Discriminator Model 130 is a machine learning model (e.g., a neural network) trained to distinguish between real data samples (e.g., those used to train the Pre-Trained Classifier 140) and simulated data samples (generated by the Generator Model 115). In embodiments, the Discriminator Model 130 is trained alongside the Generator Model 115 and provides pressure to make the Generator Model 115 improve the accuracy of its generated data samples.

In the illustrated embodiment, the Memory 810 includes a Generator Application 850. Although depicted as software residing in Memory 810, in embodiments, the functionality of the Generator Application 850 may be implemented using software, hardware, or a combination of software and hardware. As illustrated, the Generator Application 850 includes a Training Component 855 and an Evaluation Component 860. Although depicted as discrete components for conceptual clarity, in embodiments, the operations of the Training Component 855 and Evaluation Component 860 may be combined or distributed across any number of components.

In an embodiment, the Training Component 855 is used to train the Generator Model 115 and Discriminator Model 130, as discussed above. This may include computing a discriminator loss based on output of the Discriminator Model 130 (where that output is generated based on simulated data and/or real data samples being used as input), as well as computing a classifier loss based on output of the Pre-Trained Classifier 140 when simulated data (generated by the Generator 115) is provided as input. In an embodiment, the Training Component 855 refines the Discriminator Model 130 based on the discriminator loss, which forces the Discriminator Model 130 to learn to distinguish between real data samples and simulated data samples.

In some embodiments, the Training Component 855 refines the Generator Model 115 based on both the discriminator loss and the classifier loss. In one such embodiment, the discriminator loss causes the Generator Model 115 to learn to generate realistic data samples, while the classifier loss forces the Generator Model 115 to learn to generate data samples that match the particular target label.

In the illustrated embodiment, the Evaluation Component 860 can generally use the trained Generator Model 115 to generate simulated data samples, and analyze such data samples to evaluate the quality of the Pre-Trained Classifier 140, as discussed above. This may include, for example, identifying common features across the simulated data samples (indicating features that were relied on by the classifier), identifying suspicious features in the simulated data samples (indicating potential poisoning of the classifier), identifying missing features from the simulated data samples (indicating features that were not relied upon by the classifier), determining that the simulated data samples are not recognizable or have significant noise (indicating insufficient training data for the class), and the like.

In some embodiments, based on this evaluation, the Generator Application 850 (or another component or device) can take a variety of actions. These may include determining not to use the Pre-Trained Classifier 140 during runtime, generating a quality score or indication for the classifier, indicating the particular refinements or improvements that can be made (such as collecting more training data for a given class), actually refining the Pre-Trained Classifier 140 based on the results of the evaluation, and the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Generator Application 850) or related data available in the cloud. For example, the Generator Application 850 could execute on a computing system in the cloud and train Generator Models 115 based on pre-trained models. In such a case, the Generator Application 850 could train and use Generator Models 115 to recover and analyze training data for the classifiers, and store the models and evaluation results at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving a classifier model that was trained using one or more data samples in belonging to a plurality of classes;
determining a target class of the plurality of classes; and
training a generative adversarial network (GAN) to generate simulated data samples belonging to the target class, comprising:
generating a random input vector;
generating a first simulated data sample based on processing only the random input vector using a generator model;
generating a first discriminator output by processing the first simulated data using a discriminator model, wherein the first discriminator output predicts whether the first simulated data sample was generated by the generator model;
computing a first discriminator loss based on whether the first discriminator output accurately classifies the first simulated data sample as having been generated by the generator model;
generating a second discriminator output by processing a first data samples from one or more non-target classes of the plurality of classes using the discriminator model, wherein the second discriminator output predicts whether the first data sample was generated by the generator model;
computing a second discriminator loss based on whether the second discriminator output accurately classifies the first data sample as not generated by the generator model;
generating a classifier output by processing the first simulated data sample using the classifier model, wherein the classifier output predicts whether the first simulated data sample belongs to the target class;
computing a classifier loss based on comparing the classifier output and the target class; and
refining the generator model based on the first discriminator loss, the second discriminator loss, and the classifier loss.

2. The method of claim 1, wherein the GAN is trained without processing any data samples in the target class.

3. The method of claim 1, wherein training the GAN further comprises:
generating a second simulated data sample using the generator model;
computing a third discriminator loss by processing the second simulated data sample using the discriminator model; and
refining the discriminator model based on the third discriminator loss.

4. The method of claim 1, wherein the discriminator model is trained to differentiate between the simulated data samples generated by the generator model and data samples not generated by the generator model.

5. The method of claim 1, the method further comprising:
generating an evaluation data sample for the target class by providing the generator model with a randomized input vector.

6. The method of claim 5, the method further comprising:
determining that the classifier model was trained with insufficient data samples in the target class based at least in part on the evaluation data sample, wherein determining that the classifier model was trained with insufficient data comprises determining that accuracy of the classifier model with respect to the target class is below a threshold.

7. The method of claim 5, the method further comprising: determining that the data samples in the target class used to train the classifier model included one or more suspicious features based at least in part on the evaluation data sample.

8. One or more computer-readable storage media collectively containing computer program code that, when executed by operation of one or more computer processors, performs an operation comprising:
receiving a classifier model that was trained using one or more data samples in belonging to a plurality of classes;
determining a target class of the plurality of classes; and
training a generative adversarial network (GAN) to generate simulated data samples belonging to the target class, comprising:
generating a random input vector;
generating a first simulated data sample based on processing only the random input vector using a generator model;
generating a first discriminator output by processing the first simulated data using a discriminator model, wherein the first discriminator output predicts whether the first simulated data sample was generated by the generator model;
computing a first discriminator loss based on whether the first discriminator output accurately classifies the first simulated data sample as having been generated by the generator model;
generating a second discriminator output by processing a first data samples from one or more non-target classes of the plurality of classes using the discriminator model, wherein the second discriminator output predicts whether the first data sample was generated by the generator model;
computing a second discriminator loss based on whether the second discriminator output accurately classifies the first data sample as not generated by the generator model;
generating a classifier output by processing the first simulated data sample using the classifier model, wherein the classifier output predicts whether the first simulated data sample belongs to the target class;
computing a classifier loss based on comparing the classifier output and the target class; and
refining the generator model based on the first discriminator loss, the second discriminator loss, and the classifier loss.

9. The computer-readable storage media of claim 8, wherein the GAN is trained without processing any data samples in the target class.

10. The computer-readable storage media of claim 8, wherein training the GAN further comprises:
generating a second simulated data sample using the generator model;
computing a third discriminator loss by processing the second simulated data sample using the discriminator model; and
refining the discriminator model based on the third discriminator loss.

11. The computer-readable storage media of claim 8, wherein the discriminator model is trained to differentiate between the simulated data samples generated by the generator model and data samples not generated by the generator model.

12. The computer-readable storage media of claim 8, the operation further comprising:
generating an evaluation data sample for the target class by providing the generator model with a randomized input vector.

13. The computer-readable storage media of claim 12, the operation further comprising:
determining that the classifier model was trained with insufficient data samples in the target class based at least in part on the evaluation data sample, wherein determining that the classifier model was trained with insufficient data comprises determining that accuracy of the classifier model with respect to the target class is below a threshold.

14. The computer-readable storage media of claim 12, the operation further comprising:
determining that the data samples in the target class used to train the classifier model included one or more suspicious features based at least in part on the evaluation data sample.

15. A system comprising:
one or more computer processors; and
one or more memories collectively containing one or more programs which when executed by the one or more computer processors performs an operation, the operation comprising:
receiving a classifier model that was trained using one or more data samples belonging to a plurality of classes;
determining a target class of the plurality of classes; and
training a generative adversarial network (GAN) to generate simulated data samples belonging to the target class, comprising:
generating a random input vector;
generating a first simulated data sample based on processing only the random input vector using a generator model;
generating a first discriminator output by processing the first simulated data using a discriminator model, wherein the first discriminator output predicts whether the first simulated data sample was generated by the generator model;
computing a first discriminator loss based on whether the first discriminator output accurately classifies the first simulated data sample as having been generated by the generator model;
generating a second discriminator output by processing a first data samples from one or more non-target classes of the plurality of classes using the discriminator model, wherein the second discriminator output predicts whether the first data sample was generated by the generator model:
computing a second discriminator loss based on whether the second discriminator output accurately classifies the first data sample as not generated by the generator model;
generating a classifier output by processing the first simulated data sample using the classifier model, wherein the classifier output predicts whether the first simulated data sample belongs to the target class;

computing a classifier loss based on comparing the classifier output and the target class; and refining the generator model based on the first discriminator loss, the second discriminator loss, and the classifier loss.

16. The system of claim 15, wherein the GAN is trained without processing any data samples in the target class, and wherein training the GAN further comprises:

generating a second simulated data sample using the generator model;

computing a third discriminator loss by processing the second simulated data sample using the discriminator model; and refining the discriminator model based on the third discriminator loss.

17. The system of claim 15, wherein the discriminator model is trained to differentiate between the simulated data samples generated by the generator model and data samples not generated by the generator model.

18. The system of claim 15, the operation further comprising:

generating an evaluation data sample for the target class by providing the generator model with a randomized input vector.

19. The system of claim 18, the operation further comprising:

determining that the classifier model was trained with insufficient data samples in the target class based at least in part on the evaluation data sample, wherein determining that the classifier model was trained with insufficient data comprises determining that accuracy of the classifier model with respect to the target class is below a threshold.

20. The system of claim 18, the operation further comprising:

determining that the data samples in the target class used to train the classifier model included one or more suspicious features based at least in part on the evaluation data sample.

* * * * *